Figure 1:
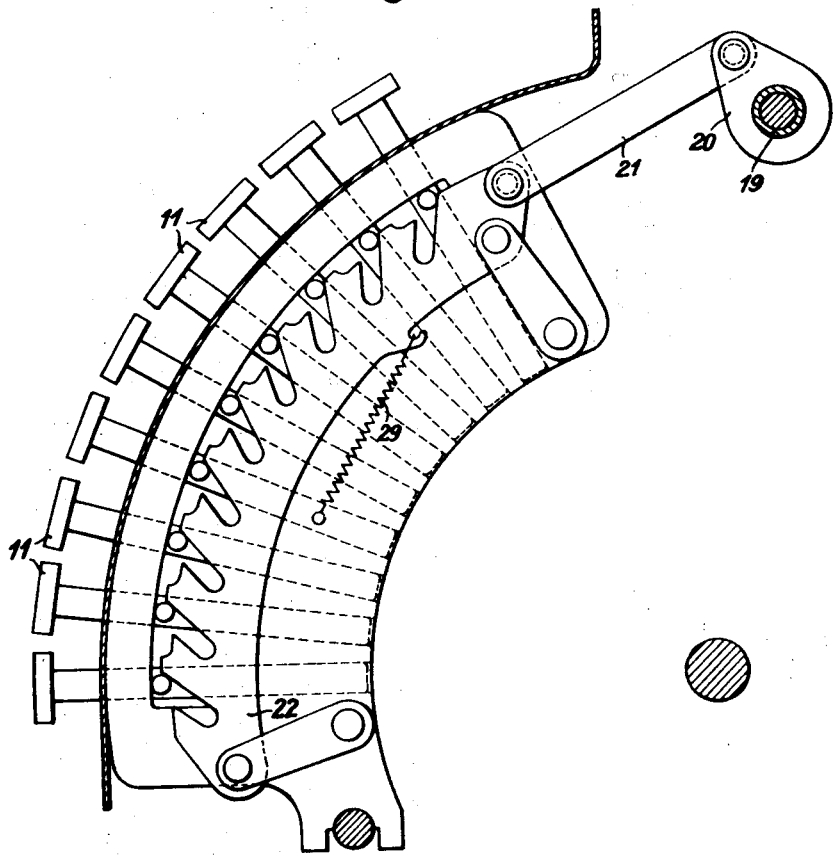

Feb. 23, 1937.  E. BREITLING  2,071,387
ACCOUNTING MACHINE
Filed July 19, 1935  8 Sheets-Sheet 1

Inventor
Ernst Breitling
By
Earl Beust
His Attorney

Feb. 23, 1937.   E. BREITLING   2,071,387
ACCOUNTING MACHINE
Filed July 19, 1935   8 Sheets-Sheet 5
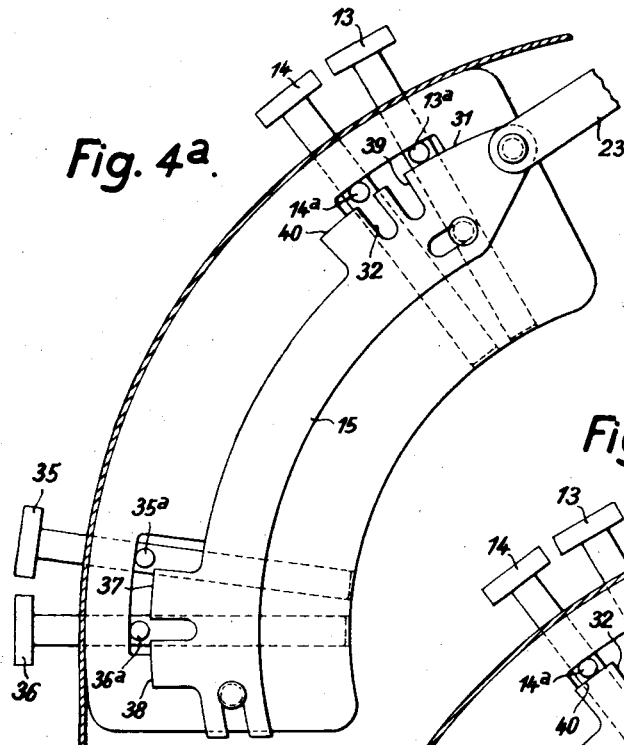
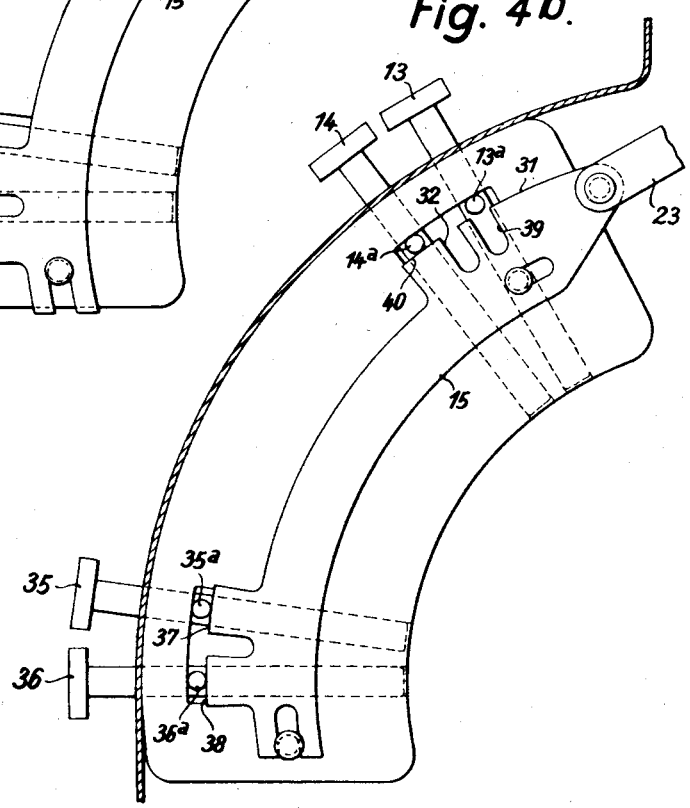
Inventor
Ernst Breitling
By
Carl Beust
His Attorney

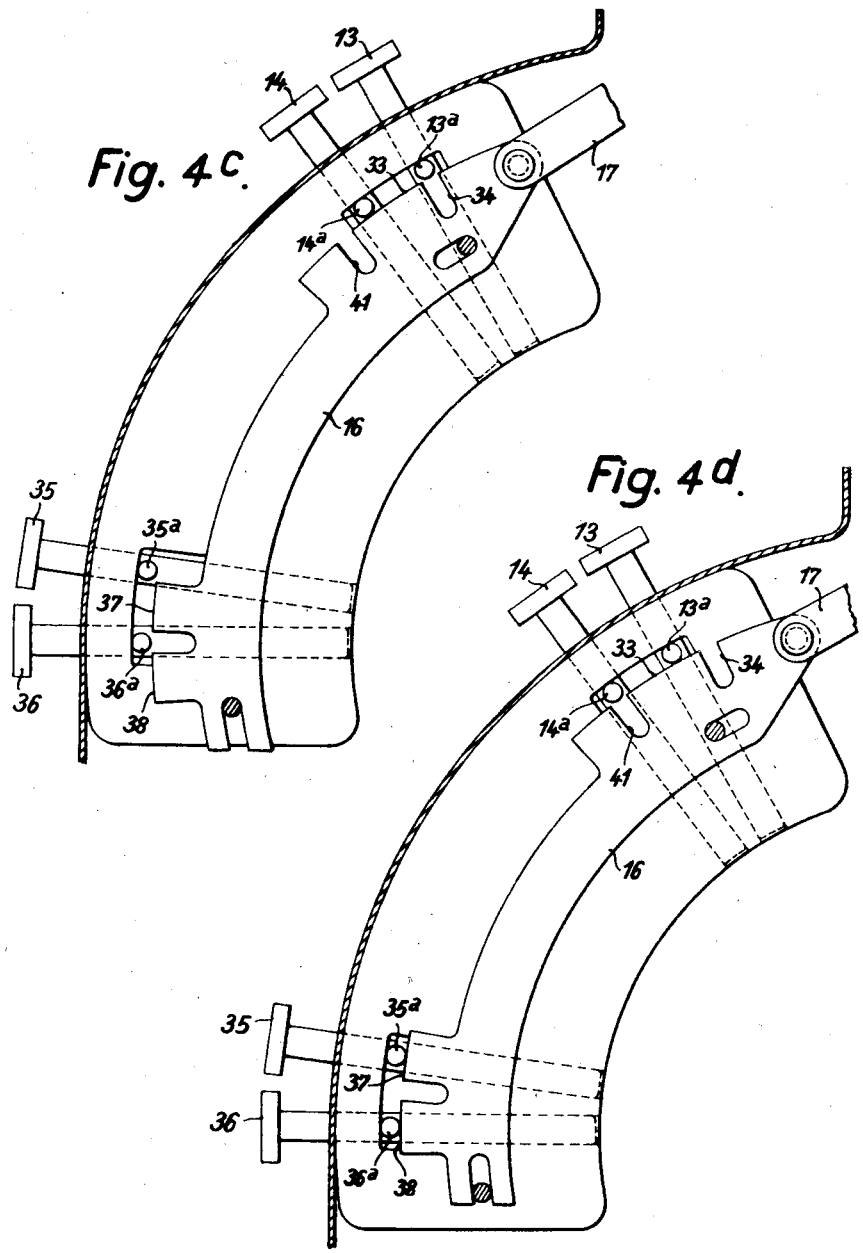

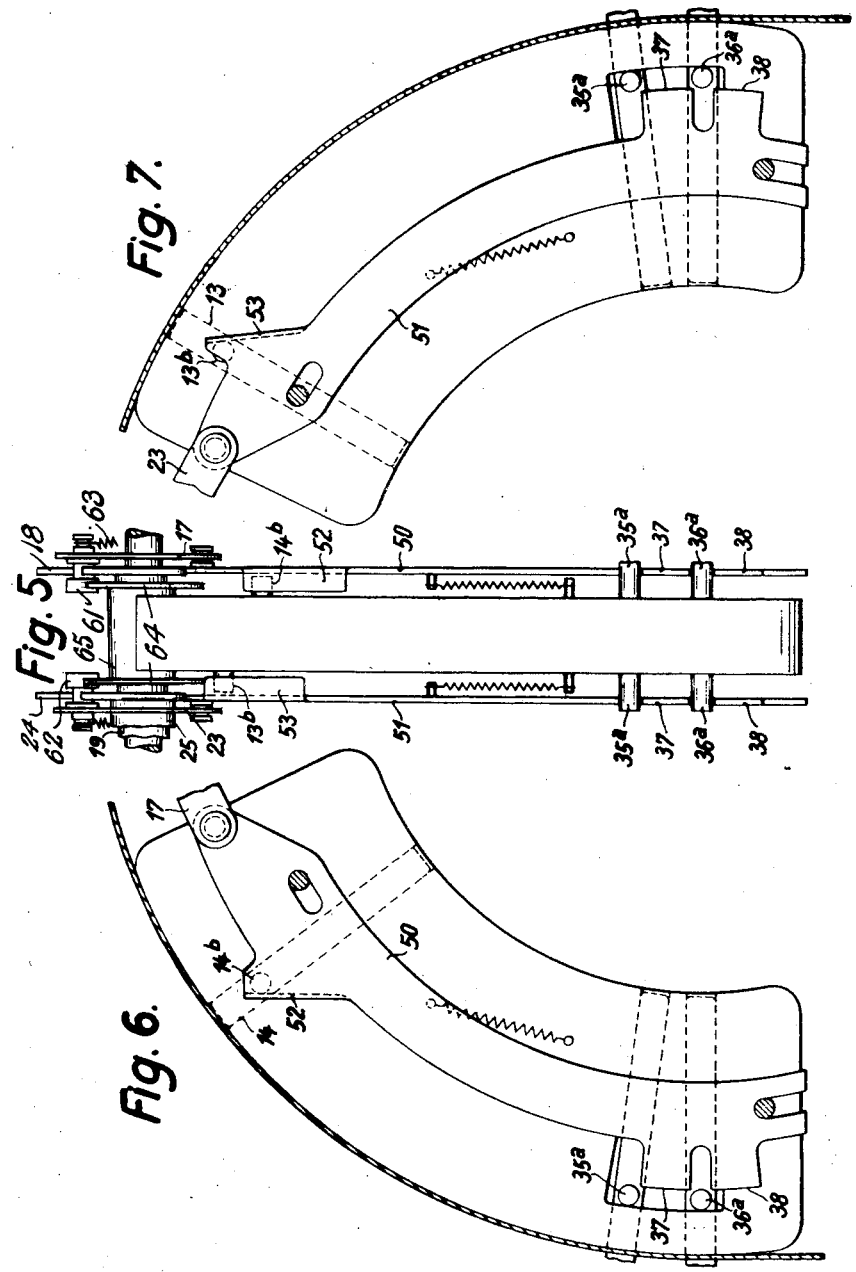

Feb. 23, 1937.   E. BREITLING   2,071,387
ACCOUNTING MACHINE
Filed July 19, 1935   8 Sheets-Sheet 8

Inventor
Ernst Breitling
By
Carl Benst
His Attorney

Patented Feb. 23, 1937

2,071,387

UNITED STATES PATENT OFFICE 2,071,387

ACCOUNTING MACHINE

Ernst Breitling, Berlin-Tempelhof, Germany, assignor to The National Cash Register Company, Dayton, Ohio, a corporation of Maryland Application July 19, 1935, Serial No. 32,241
In Germany September 25, 1933

6 Claims. (Cl. 235—130)

The invention relates to accounting machines of the type comprising a plurality of groups of setting members for classifying the entered amounts from various points of view, especially the sign of the amounts to be entered. Thus a group is provided which is operable when entering positive transactions and a group is provided which is operable when entering negative transactions. An accumulator is associated with each group of setting members, and, associated with each accumulator is a selecting member which is operable to select its accumulator to accumulate the amounts entered in its associated group.

The main object of the invention is to provide a control device which normally prevents the actuation of the accumulator selecting members, but which is automatically disabled to render possible the selection of an accumulator on actuation of a setting member in the group associated therewith.

Another object of the invention is to provide a key lock for the groups of setting keys appertaining to separate accumulators for the further classification of the positive and negative entries, and adapt said key interlock in such a way that it frees the selecting key for the positive accumulator on depression of one of the keys for classifying the positive entries and which frees the selecting key for the negative accumulator on depression of one of the keys for classifying the negative entries.

A further object of the invention is to adapt the control device for preventing actuation of either of the accumulator selecting keys in the event of a key for classifying the positive and a key for classifying the negative amounts being depressed simultaneously.

A still further object of the invention consists in such an arrangement of the control device that on actuation of a setting member of one of the groups the member for selecting the associated accumulator is likewise automatically actuated so that, for example, on depression of a key for classifying the positive entries, the key for the positive accumulator is automatically actuated and on depression of a key for classifying the negative entries the key for the negative accumulators is likewise automatically actuated.

Further objects of the invention will be pointed out in the following detailed description with reference to the annexed drawings.

Two embodiments of the invention will now be described in further detail, by way of example, with reference to the accompanying drawings, in which Figs. 1 to 4d illustrate the first embodiment, and Figs. 5 to 9 the second embodiment.

Figure 2:
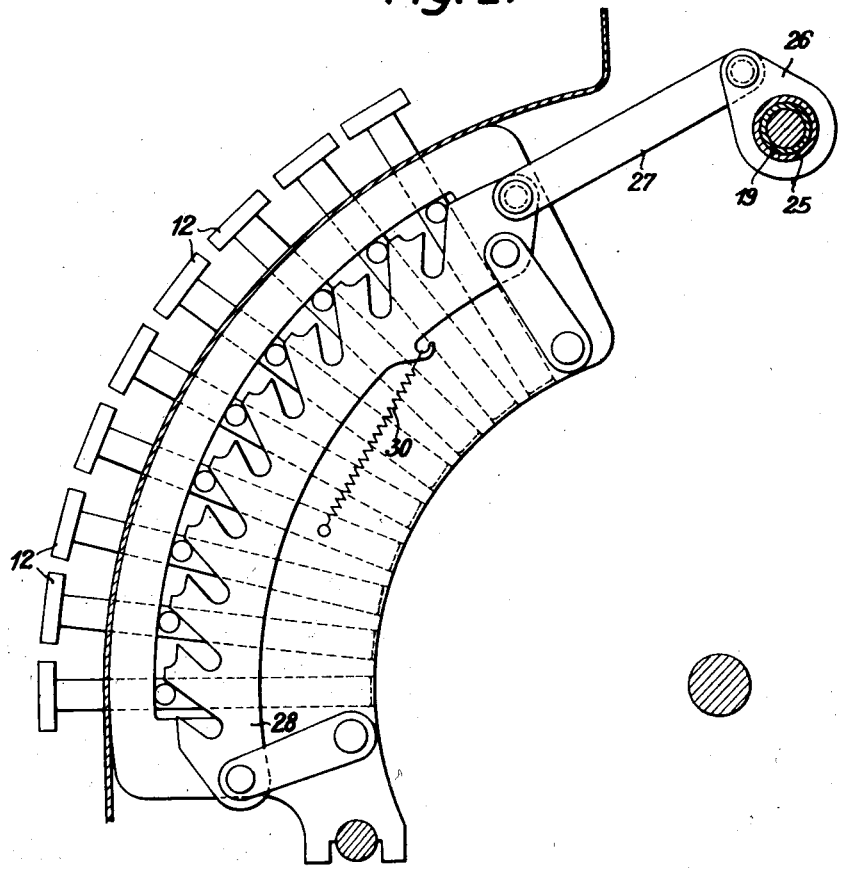
Figure 3:
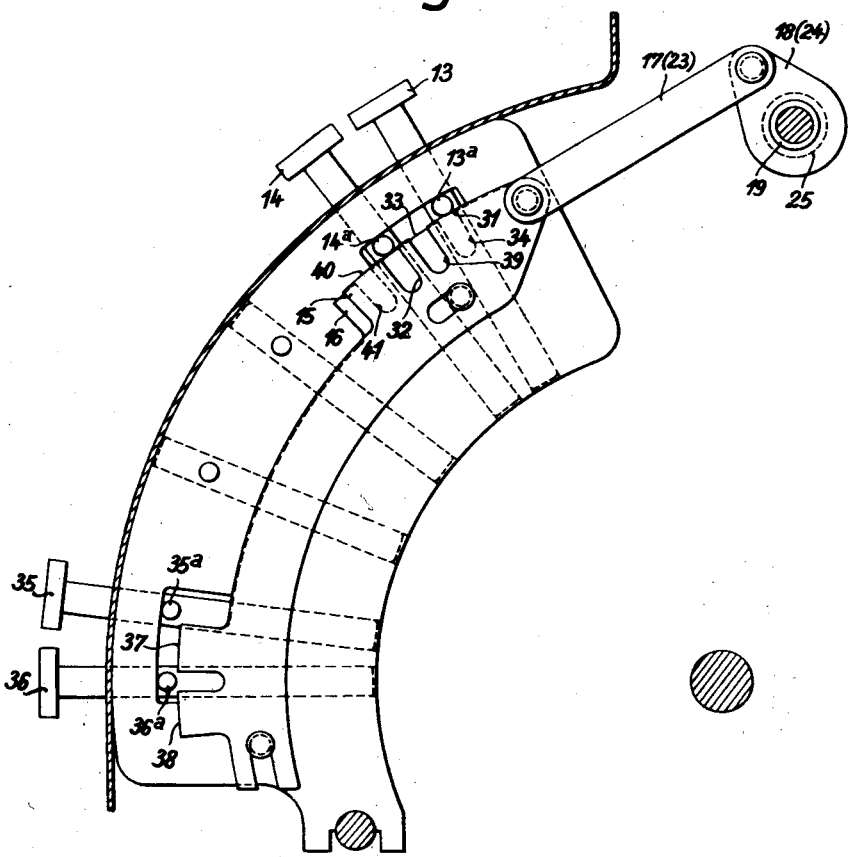
Figure 4:
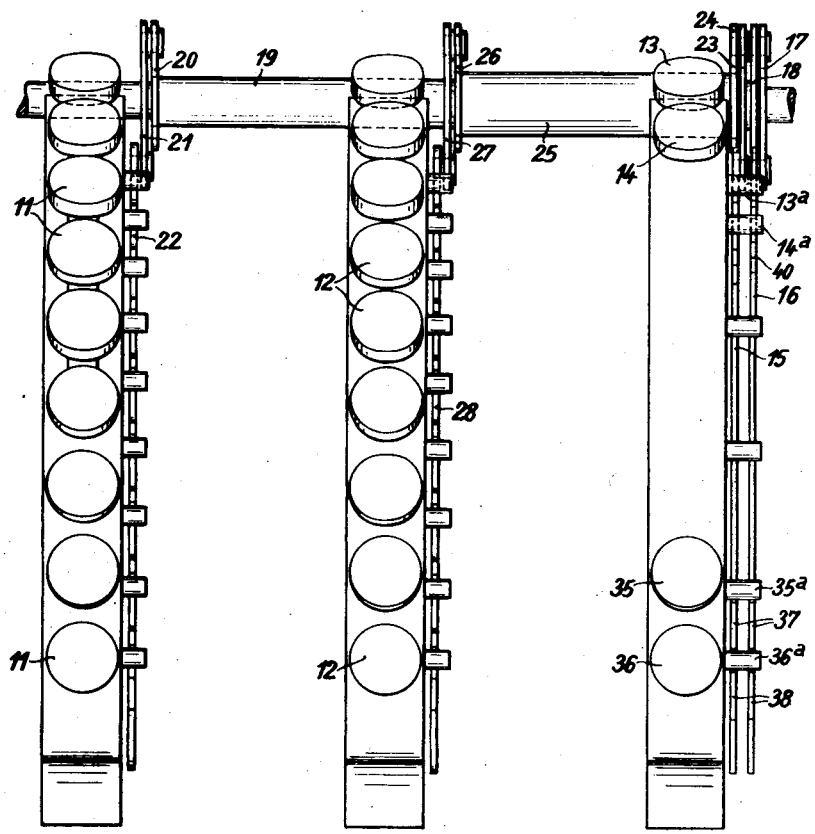

Of said drawings:

Fig. 1 shows a side elevation of the first bank of auxiliary totalizer keys;

Fig. 2 a side elevation of the second auxiliary totalizer key bank;

Fig. 3 a side elevation of the balance key bank;

Fig. 4 a front elevation of the three totalizer key banks with the key interlocking device;

Figs. 4a to 4d showing the various working positions of the locking slides;

Fig. 5 is a front elevation of the balance key bank in the second embodiment;

Figs. 6 and 7 each representing a side elevation of the same arrangement.

Figure 8:
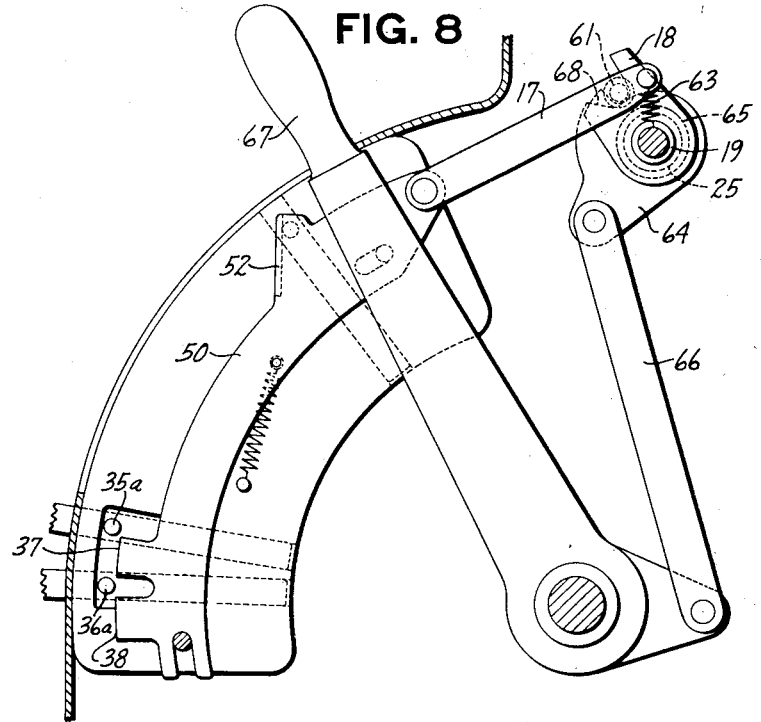
Figure 9:
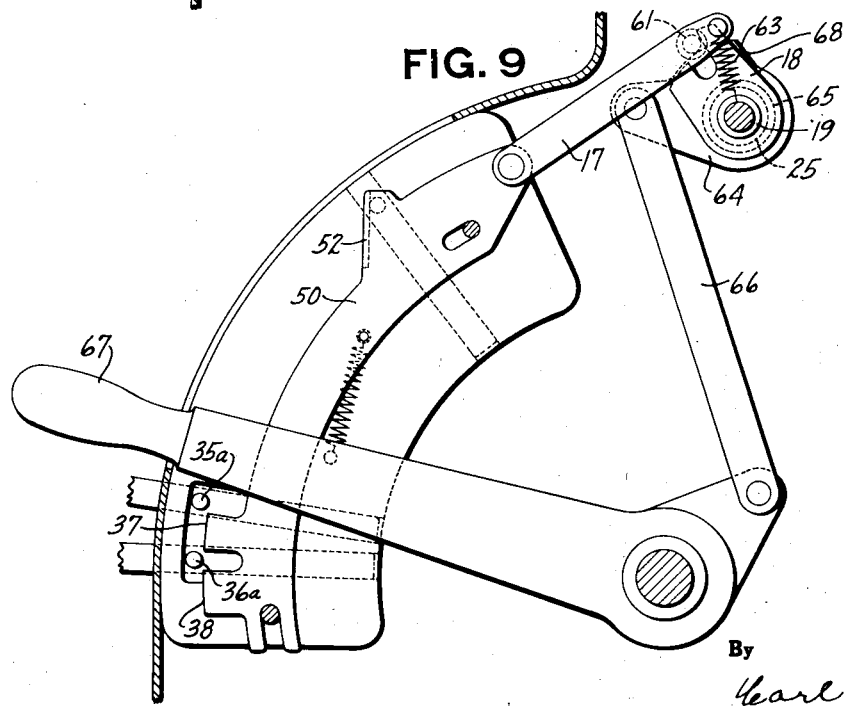

Figs. 8 and 9 show the coupling in its effective and ineffective positions.

The drawings of both embodiments illustrate a balance calculating machine of known kind having a row of debit keys 11, a row of credit keys 12 and in the balance key bank a key 13 for the deposits and a key 14 for the withdrawals. The keys 11 serve for the classified accumulation of the withdrawals and are therefore only allowed to be depressed together with the balance key 14, whilst the keys 12 serve for the classified accumulation of the deposits and are therefore only allowed to be depressed together with the balance key 13. To render this possible two locking slides 15 and 16 are provided in the balance key bank. The locking slide 16 is connected with a slide 22 in the debit key bank by means of a link 17, an arm 18, a sleeve 19, an arm 20 and a link 21, whilst the locking slide 15 is connected with a slide 28 in the credit key bank by means of corresponding parts 23, 24, 25, 26, 27 (see Figs. 1 to 4). So long as none of the keys 11 is depressed the locking slide 16 is held by the spring 29 in such a position that its locking surface 33 locks the key 14, whilst its slot 34 lies opposite the key pin 13a of the key 13 (Fig 4c). The locking slide 15 is normally held by a spring 30 in such a position that its locking surface 31 locks the key 13 whilst its slot 32 lies opposite the pin 14a of the key 14 (Fig. 4a). Both the keys 13 and 14 are therefore locked (Figs. 4, 4a, 4c). In this position of the two locking slides 15 and 16, the two keys 35, 36 for the old credit and debit balances are free, as their pins 35a and 36a do not lie opposite either of the locking abutments 37, 38 which are provided in the same position on each of the locking slides 15 and 16. If now one of the keys 11 is depressed, the slide 22 is moved one step in an upward direction and owing to the parts 21, 20, 19, 18, 17, the locking slide 16 is similarly moved (Fig. 4d). The result is that the locking surface 33 of the locking slide 16 comes to lie under the pin 13a of the key 13 and therefore locks the latter whilst the pin 14a comes opposite the slot 41 of the slide 16. The key 14 is thus freed by the slots 41, 32 of the two slides 16 and 15 (Figs. 4a and 4d). The locking abutments 37, 38 of the slide 16 in this position lock the keys 35, 36.

On release of the key 11 the slide 16 is returned to its rest position in which the keys 13 and 14 are again locked (Fig. 4).

If, on the other hand, one of the keys 12 is depressed, the slide 20 causes the locking slide 15 to move one step upward (Fig. 4b). The locking surface 40 then comes opposite the key pin 14a and the slot 39 opposite the key pin 13a, so that now the key 14 is locked by the surface 33 and 40 whilst the key 13 is freed by the slots 34 and 39 in the two slides 16, 15 (Figs. 4b and 4c). The locking abutments 37, 38 of the slide 15 in this case lock the keys 35, 36.

If by mistake one of the keys 11 and also one of the keys 12 are depressed simultaneously, both the locking slides 15 and 16 come into their upper position (Figs. 4b and 4d) so that the locking surface 40 of the slide 15 comes opposite the key pin 14a and the locking surface 33 of the slide 16 opposite the key pin 13a. Consequently, both the keys 13 and 14 are locked and the machine cannot be operated further until one of the two keys 11 and 12 has been released.

In the alternative embodiment of the invention shown in Figs. 5 to 9, the keys 11 and 12 selectively depress the balance keys "deposit" and "withdrawal." To this end two slides 50 and 51 are provided in the balance key bank (Figs. 5, 6, and 7), having obliquely bent portions 52, 53 which cooperate with the pins 14b and 13b of the keys 14 and 13 which in this case are formed as blind keys. The slides 50 and 51 are coupled with the sleeves 19 and 25 in a similar way to the slides 16 and 15 of the first embodiment. If a key 11 is depressed, the slide 50 is moved upwardly and thereby by means of its bent portion 52 and the pin 14b it automatically depresses the key 14. The same holds good for the keys 12 and 13.

It is easily understood that the sleeves 19 and 25 may be interrupted by a coupling means which is disengaged by any machine conditioning means, as a mode of operation lever 67, when the latter is moved to one of its total taking positions. This coupling means is shown in Fig. 8 in the position where the slides 50 and 51 are coupled for operation by the keys 11 and 12. Fig. 9 shows the coupling means moved by the mode of operation lever to a position where the slides 50 and 51 are uncoupled from the keys 11 and 12. This means comprises notched arms 18 and 24 fastened to the sleeves 19 and 25 respectively. Each of the links 17 and 23 has a pin, as 61 or 62, which is urged into engagement with the notch in its related arm 18 or 24 by a spring, as 63, to couple the slides to the keys 11 and 12. When the mode of operation lever 67 is moved from its add to reset position, it raises the link 66 and rotates the cam arms 64 and the sleeve 65 clockwise, so that cam surfaces 68 engage the pins 61 and 62 and raise them out of the notches in the arms 18 and 24 and thus disconnect the slides 50 and 51 from the control of keys 11 and 12. The selection of the totalizers "deposit" and "withdrawal" on total taking can be effected in known manner by the totalizer lever or by keyheads placed on the blind keys 13 and 14. To prevent simultaneous depression of one of the keys 11 and one of the keys 12 a known interlocking device (not shown) may be provided between the two rows of keys.

While the form of mechanism herein shown and described, is admirably adapted to fulfill the objects primarily stated, it is to be understood that it is not intended to confine the invention to the embodiments herein disclosed, for it is susceptible of embodiment in various other forms all coming within the scope of the claims which follow.

What is claimed as new is:

1. In a machine of the class described, a plurality of banks of transaction keys, a bank of balance keys including a plurality of normally operable keys and a plurality of normally inoperative keys, one of said normally inoperative keys being related to each of said banks of transaction keys, and control means comprising a plurality of slides selectively moved by said transaction keys being mounted adjacent the bank of balance keys and having means thereon selectively cooperable with said balance keys to control the operation of the balance key related to the transaction bank in which the key is depressed and to simultaneously lock the normally operable keys against operation.

2. In a machine of the class described, a plurality of banks of transaction keys; a bank of balance keys including a plurality of normally operable keys and a plurality of normally locked keys, one of said normally locked keys being related to each of said banks of transaction keys; and a plurality of control slides, one related to each bank of transaction keys and moved by the depression of any key in its related bank, each of said control slides being mounted adjacent the bank of balance keys and, when actuated by the depression of a transaction key, having means thereon selectively cooperable with the balance keys operable to unlock its related balance key and to simultaneously lock the plurality of normally operable balance keys.

3. In a machine of the class described, the combination of a plurality of banks of transaction keys; a bank of balance keys including a plurality of normally operable manipulative devices and a plurality of blind keys, one of said blind keys being related to each of said banks of transaction keys; and a plurality of balance key control members, one of said members being related to each bank of transaction keys and moved by depression of any key in its related bank, each of said members having means to operate the blind key related to its bank of transaction keys and also having means to lock the normally operable manipulative devices against operation.

4. In a machine of the class described, a bank of keys including a manually operable key and a blind key; and means for controlling the operation of the keys including a member having control means thereon, whereby the member, when operated, causes the operation of the blind key and simultaneously blocks the operation of the manually depressible key.

5. In a machine of the class described, a bank of keys including a normally operable key and a plurality of normally locked keys; and means for controlling the operation of the keys including a shiftable slide related to each of the plurality of normally locked keys, said slides being mounted adjacent the bank of keys and each slide having control means thereon selectively cooperable with the keys to control the operation of the keys, the shifting of any one of said slides causing its control means to unlock the normally locked key related thereto and to simultaneously lock the normally operable key, and the simultaneous shifting of a plurality of said slides causing the control means on said slides to lock all of said keys against operation.

6. In a machine of the class described, the combination of a plurality of banks of transaction keys; a bank of balance keys including a plurality of normally operable manipulative keys and a plurality of blind keys, one of said blind keys being related to each of said banks of transaction keys; a plurality of balance key control members, one of said members being related to each bank of transaction keys; means operated by the keys in each bank of transaction keys; means to couple said means to the control members to move one of said control members by the depression of any key in its related bank, each of said members having means to operate the blind key related to its bank of transaction keys and also having means to lock the normally operable manipulative keys against operation; and a manipulative means for rendering said coupling means ineffective whereby the control members are released from the control of the transaction keys.

ERNST BREITLING.